US008316802B2

(12) United States Patent  
Hallock

(10) Patent No.: US 8,316,802 B2
(45) Date of Patent: Nov. 27, 2012

(54) REUSABLE WATER LINE GROMMET AND DISPOSABLE CAGE BOX

(75) Inventor: William J. Hallock, Hazleton, PA (US)

(73) Assignee: Thoren Caging Systems, Inc., Hazleton, PA (US)

( * ) Notice: Subject to any disclaimer, the term of this patent is extended or adjusted under 35 U.S.C. 154(b) by 673 days.

(21) Appl. No.: 12/494,714

(22) Filed: Jun. 30, 2009

(65) Prior Publication Data

US 2010/0326365 A1 Dec. 30, 2010

(51) Int. Cl.
*A01K 5/00* (2006.01)
(52) U.S. Cl. .......... 119/456; 119/475; 119/72; 119/72.5
(58) Field of Classification Search .............. 119/51.5, 119/72, 72.5, 75, 76, 416, 455, 456, 457, 119/475, 482, 496
See application file for complete search history.

(56) References Cited

U.S. PATENT DOCUMENTS

| 4,656,689 | A | | 4/1987 | Dennis |
| 5,042,429 | A | * | 8/1991 | Deitrich et al. ............ 119/419 |
| 5,400,744 | A | | 3/1995 | Coiro, Sr. et al. |
| 5,596,177 | A | | 1/1997 | Stark et al. |
| 6,119,305 | A | | 9/2000 | Loveall et al. |
| 6,247,426 | B1 | | 6/2001 | Lawson et al. |
| 2007/0175399 | A1 | | 8/2007 | Conger et al. |
| 2008/0200064 | A1 | | 8/2008 | Chong et al. |

* cited by examiner

*Primary Examiner* — Monica Williams
*Assistant Examiner* — Timothy Schwarz
(74) *Attorney, Agent, or Firm* — Duane Morris LLP

(57) ABSTRACT

An animal cage box has a grommet for passing a watering conduit through a box side wall. The grommet is removably attachable at an opening through the side wall, using a non-round configuration by which the grommet is aligned for insertion into a non-round opening, and turned to hold the grommet in place. A flange on the grommet body rests against one face of the side wall. The non-round configuration includes one or more tabs that can be cut from the flange and are displaced axially by a distance equal to the side wall thickness. A hinge flap that can be grasped in the fingers helps to hold, align, insert or remove and twist the grommet relative to the side wall. The disclosed arrangement further minimized the cost of using inexpensive disposable cage boxes because relatively expensive grommets, for example of stainless steel, can be cleaned and reused.

8 Claims, 6 Drawing Sheets

REUSABLE WATER LINE GROMMET AND DISPOSABLE CAGE BOX

BACKGROUND

1. Field of the Invention

This disclosure concerns animal cage box enclosures and the fittings by which utility connections are made into the interior of the cage box, especially for passage of water lines for drip fittings. A lightweight cage box is provided and is disposable, whereas a grommet for receiving a water fitting can be removed and reused.

2. Prior Art

High density animal caging systems are used in laboratories and other applications, wherein plastic boxes form cages that confine one or more animals, such as laboratory mice, rats, etc. A number of such cages can be kept in shelving that optionally has conduits for bringing ventilation and drinking water to each box. Caging systems of this type are available from Thoren Caging Systems, Inc. of Hazleton, Pa. and are exemplified by U.S. Pat. Nos. 5,474,024; 5,044,316; and 4,690,100.

The cages typically comprise a rigid one-piece injection molded clear polycarbonate box with an open top. In some exemplary embodiments, the box may be flanged for hanging the cage under one or more ventilation conduits. The box may receive a wire rack with a receptacle for food pellets or a water bottle. A filter cover may fit over the top to prevent passage of dust and dander. The animals can be observed through transparent side walls. In order to care for the animals, for example to change the bedding, the cage boxes are withdrawn from the shelving. In the case of water and ventilation lines brought to the cage by the shelving, withdrawing the cage box from the shelving also disengages the cage from water and air supplies.

More or less complicated structures are provided in the wall of the cage box wherein the water or air supply conduit attaches to the cage or extends through the cage wall. Examples of such structures include inwardly or outwardly opening cup shapes with flanges overlapping the cage wall around an opening for a water or air line or fitting to pass through. Some variations comprise shapes that are molded into the side wall of the cage box, but typically, a round opening is provided in the cage wall and a fitting such as grommet is permanently affixed to the cage wall at the opening.

As used in this disclosure, the term "grommet" is used to refer to any of various protective or functional elements that line an opening through a wall, or carry a passageway through a wall between opposite sides, with one or more flanges or similar parts resting against at least one side of the wall to retain the grommet in place.

In the case of a plastic molded cage box, an inner or outer grommet part may have a flanged cylindrical tube, for example, fitted into a round opening in the cage wall such that the flange rests against the surface of the cage wall adjacent to the opening on a first side. A complementary opposed grommet washer or flange or similar part typically resides against the cage wall adjacent to the opening on the opposite side, causing the grommet or grommet assembly to be permanently captured at the opening. Typically, the cage wall is about 5 mm thick. The flanges surrounding the opening extend about 5 mm outwardly from the perimeter of the opening. The opposed part might be press fit over or into the tube or might be spot welded, threaded or similarly affixed. The opposed part has an annular flange or washer that engages against the cage wall on an opposite side.

In various embodiments, the grommet can carry part of the conduit or might carry a closure element such as a slotted rubber or plastic panel through which a tube is pushed. However in the case of animals such as mice, it is advisable to shield from animal access any parts that might be gnawed away. It is also advisable to provide parts that fit together without undue clearance. A mouse, and especially a mouse pup, can squeeze through a relatively small opening to escape. For these reasons, grommets typically are durable stainless steel elements, for example 18 or 20 gauge stainless steel stamped sheet metal forms. In an example provided in caging systems marketed by Thoren Caging Systems, Inc., a cover flap is mounted to hinge inwardly over a central hole when the cage is pushed into place on the shelf, i.e., when inward pressure from the water fitting during insertion presses the flap aside. The flap is spring biased to close the opening when the cage is pulled away from the water fitting, preventing the occupants from escaping through the opening.

The typical cage is a durable assembly wherein the cage box comprises a molded polycarbonate box with a permanently affixed stainless steel grommet. The cage box material is typically high temperature polycarbonate, as needed to survive handling, hot water washing with effective sanitizing chemicals and autoclaving to 135° C.

An inexpensive but less durable cage box is also known, but is intended to be disposable or at least less long-lived. This single use disposable cage box comprises a less durable material that is relatively thin and more flexible than a polycarbonate cage box, e.g., 1 mm thick polyethylene sulfonate. The disposable cage box is inexpensive, including when one factors in the fact that the disposable box need not be processed by autoclaving or the like. The disposable box has a sufficiently rigid edge flange to support a wire rack and a cage cover like a polycarbonate box.

The disposable cage box also could be outfitted with a grommet for receiving the input of a watering fitting provided in a shelf rack and placed to pass through the grommet when the cage is inserted into the shelf rack. A grommet or something functionally similar is necessary, namely to provide a route for the water fitting when inserted or retracted from the cage box, and a closure that reduces or eliminates clearance through which animals might escape, and either fits over or prevents access to edges of the passage through the cage box wall, where the animals would gnaw if given the opportunity. Unfortunately, however, a grommet structure sufficient to do the job is more expensive than the disposable cage box. As a result, disposable cage boxes are not used with push-in watering facilities.

What is needed is a way to exploit the cost savings of single use cage boxes that can be discarded after a single use, without adding the cost of a water-fitting grommet.

SUMMARY

It is an object of the present disclosure to provide a way in which water fitting grommets can be salvaged from single use cage boxes and re-used.

Another object is to produce a particular grommet structure that facilitates convenient assembly and disassembly of a grommet with a cage box. This assembly preferably involves a non-round opening in the cage wall and a grommet flange structure comprising a substantially circular inner flange and a non-round outer flange that can be inserted though the non-round opening. Then by turning the flange to misalign the outer flange relative to the non-round opening, the grommet is fixed axially in position, protects the cage wall from gnawing at the opening, and can be just as easily removed and re-used when the disposable cage box is to be discarded.

An exemplary cage box and grommet assembly comprises a grommet with diametrically opposite tabs stamped from and displaced axially from the flange on the grommet that resides on the inside of the cage wall. The axial displacement is equal to or only slightly greater than the cage wall thickness. The corresponding opening in the cage wall is circular but for diametrically opposite tab clearance openings providing space for the tabs stamped from the grommet flange to pass axially through the cage wall. The opening the wall, including the tab clearance openings can be die cut from the cage wall using a simple stamping cutter.

Assembly of the grommet to the cage box is accomplished by locating the grommet on the inside of the cage box, aligning the tabs stamped from the grommet flange to the tab clearance openings, inserting the grommet axially to pass the tabs through the openings, and rotating the grommet, e.g., by 90°, so that the tabs no longer align with the openings.

In an exemplary arrangement, a flap is mounted on a hinge on one lateral side of the grommet, and spring biased to close over the opening in the grommet through which the water fitting can pass. The flap can be grasped manually in the fingers of the person assembling or disassembling the grommet on the cage box and easily manipulated during assembly and disassembly.

The present objects and advantages are achieved in an animal cage box having a grommet defining a passage for a watering conduit through a box side wall, wherein the grommet is removably attachable at an opening forming a passage through the side wall, using a non-round configuration by which the grommet is rotationally aligned for insertion into a non-round opening, and upon insertion is turned to hold the grommet in place. A flange on the grommet body rests against one face of the side wall. The non-round configuration includes one or more tabs that can be cut from the flange and are displaced axially by a distance equal to the side wall thickness. A hinge flap that can be grasped in the fingers helps to hold, align, insert or remove and twist the grommet relative to the side wall. The disclosed arrangement further minimized the cost of using inexpensive disposable cage boxes because relatively expensive grommets, for example of stainless steel, can be cleaned and reused.

Additional aspects and advantages of these and other alternative embodiments of the invention will be made apparent with reference to the following non-limiting description of examples. However, it should be noted that the scope of the invention is defined by the claims appearing at the end of the disclosure.

BRIEF DESCRIPTION

The appended drawings show examples of embodiment that are presently preferred but the invention is capable of embodiment in other specific ways that are also encompassed by the appended claims. In the drawings, FIG. 1 is a schematic view of a cage rack carrying cage boxes on shelves.

DETAILED DESCRIPTION

Figure 1:
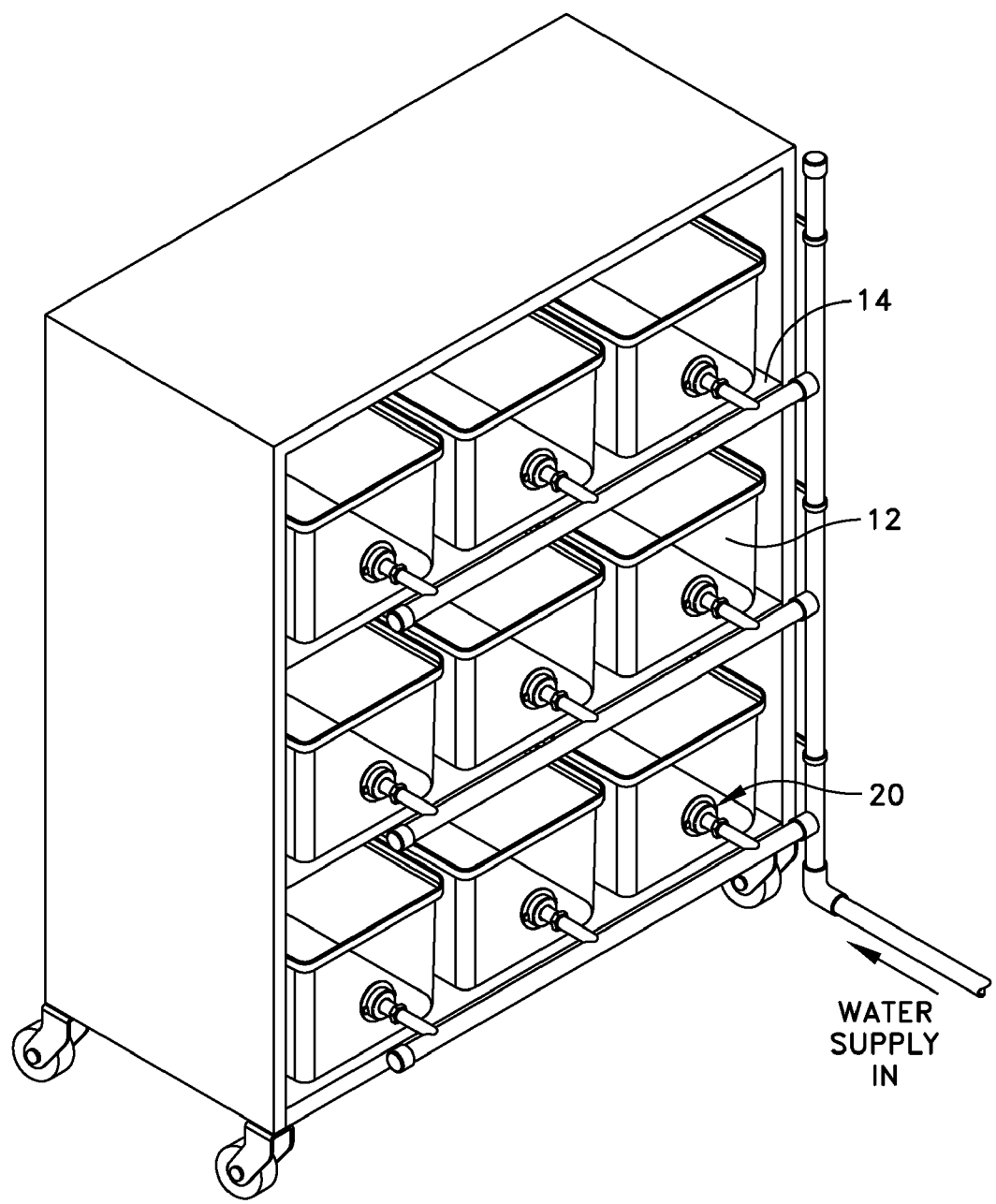
Figure 2A:
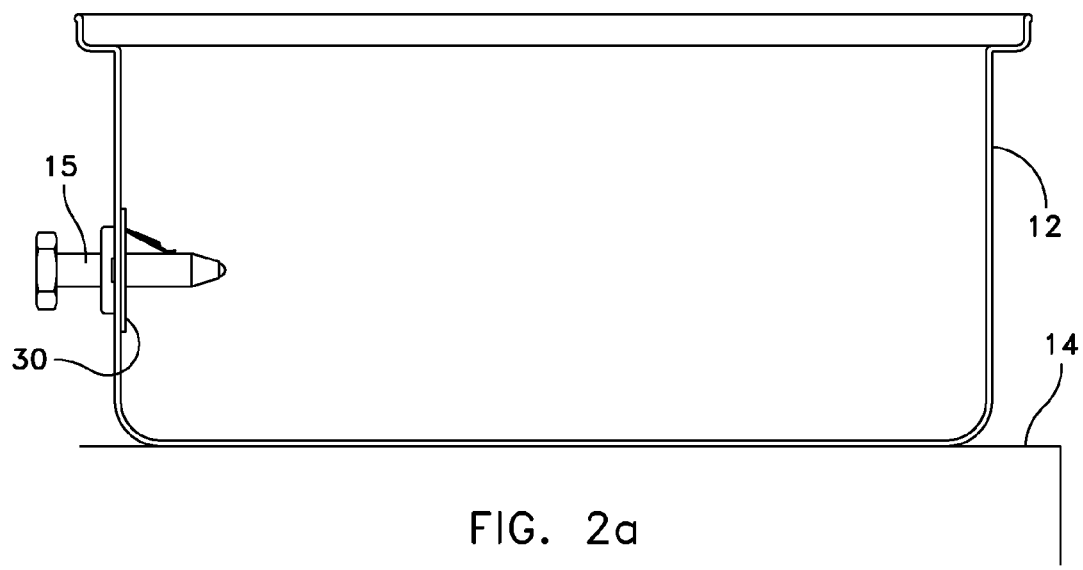
FIG. 2a is a section view showing one of the cages boxes, engaging a water fitting at the back of a shelf on the cage rack of FIG. 1.
Figure 2B:
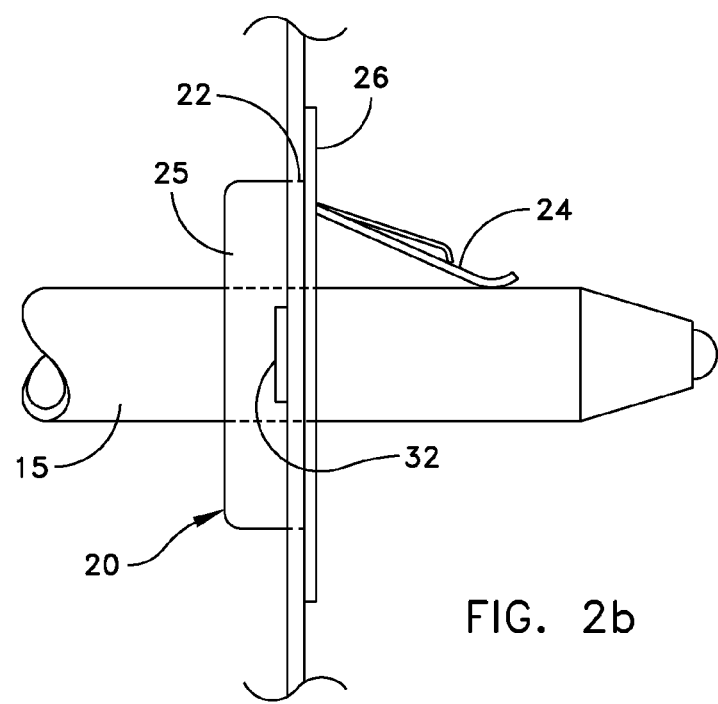
FIG. 2b is an enlargement of the area of the cage box wall in FIG. 2a, where the water fitting extends through a grommet with a hinged flap.
Figure 3:
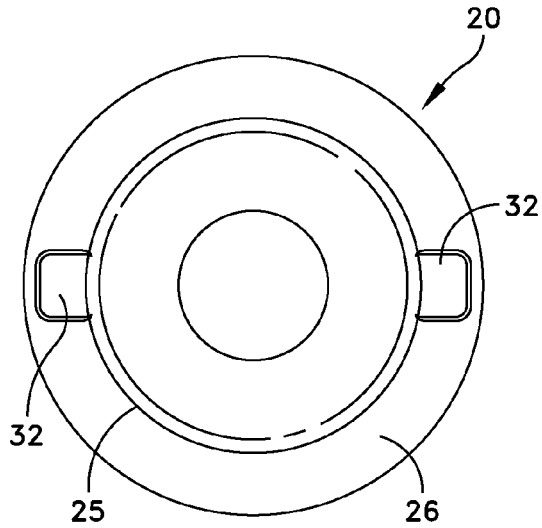
FIG. 3 is a front elevation view of the grommet from outside the cage box.
Figure 4:
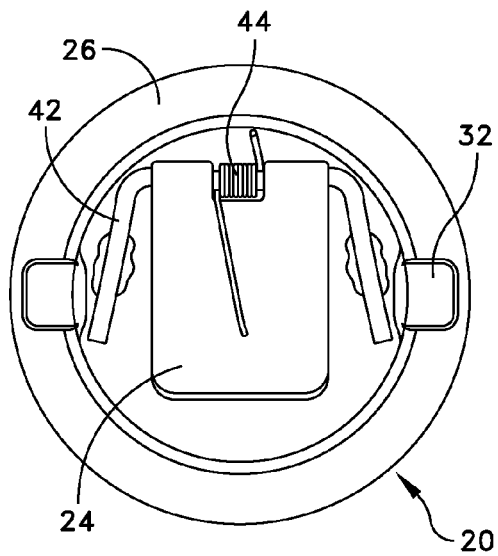
FIG. 4 is a rear elevation view of the grommet from inside the cage box (with the water fitting not inserted).
Figure 5:
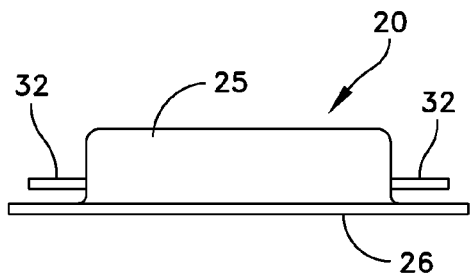
FIG. 5 is a side elevation view of the grommet showing the relative positions of the inside flange and the outside tabs.
Figure 6:
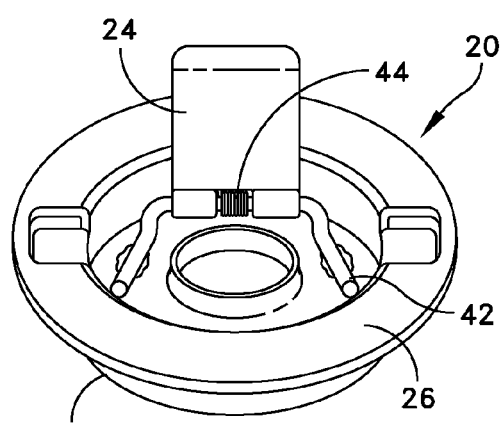
FIG. 6 is a perspective view of the grommet with the flap open.

Referring to FIG. 1, an animal housing system has a number of cage boxes 12 carried on shelves 14 and arranged as shown in FIGS. 2a and 2b to engage with water fittings 15. The water supply arrangements can be similar to those of U.S. Pat. No. 5,474,024—Hallock or U.S. Pat. No. 5,400,744—Coiro, which are hereby incorporated by reference in their entireties.

In the embodiment shown, the water supply arrangement comprises a grommet 20 that is affixed at an opening 22 in the wall of the cage box, and the water line or fitting 15 protrudes into the cage box through the grommet 20 when the cage 12 is placed in position on shelf 14. When the water line is disposed in the grommet 20 as shown, there is insufficient clearance between the water line and the grommet for a cage occupant (such as a mouse) to escape.

The grommet 20 preferably is embodied such that when the cage 12 is retracted from the water line, the grommet 20 covers likewise prevents egress by the cage occupants. The grommet 20 in the embodiment shown, for example, comprises a closure mechanism including a spring biased hinge flap 24, shown pushed open against spring bias by the water fitting in FIG. 2b. Other specific closure arrangements are also possible.

The grommet is fixed in the cage box wall and comprises a generally tubular body 25 that resides in the opening 22 in the cage box wall. On one axial end of the tubular body 25, a radially extending perimeter flange 26 is provided to reside on the inside of the cage (facing the cage occupants). The flange 26 and body 25 protect the edges of the opening 22 from gnawing by the cage occupants.

According to an advantageous aspect, the grommet is configured to be easily installed in the cage box wall or removed, being particularly useful with disposable cage boxes. The grommet can be placed and fixed temporarily in the opening 22 of the cage box wall, and later conveniently removed, preferably cleaned, and re-used in a new disposable cage box.

Figure 7:
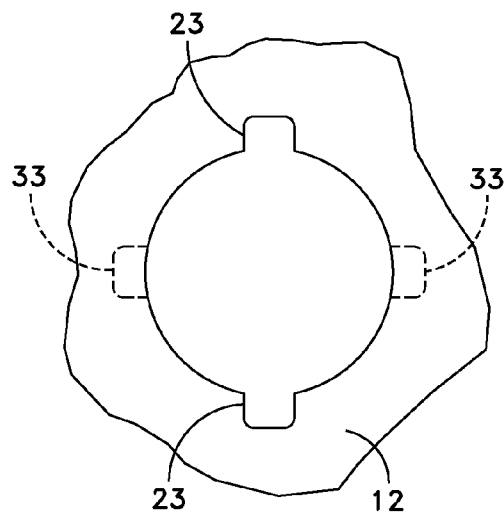
FIG. 7 is an elevation view showing the opening for the grommet in the cage box wall and identifying the installed positions of the grommet tabs.

FIGS. 3-6 show the grommet in detail, and FIG. 7 shows the opening 22 in the wall of the cage box 12. The grommet 20 is provided with a non-round shape by virtue of at least one and preferably two tabs 32 that also extend radially from tubular body 25 and are axially spaced from flange 26 by a distance at least equal to the thickness of the wall of the cage box 12. In the embodiment shown in FIGS. 3-7, two diametrically opposite tabs 32 are provided such that a cross section through the grommet 20 at the tabs 32 provides a non-round section that fits through the opening 22 shown in FIG. 7. The opening 22 in the wall of cage box 12 has two tab slots 23 that are shaped and located to complement tabs 32 of grommet 20. Upon insertion of grommet 20 axially into the opening 22, the tabs 32 pass axially through tab slots 23. Grommet 20 then is rotated, for example by 900 to place the tabs at the locking positions 33, shown in FIG. 7. This removably affixes the grommet 20 in the wall of the cage box 12.

The tubular body 25 has a cup shape with an inward annular flange on the axial end opposite from the perimeter flange 26, where a central hole receives the water fitting. Grommet 20 can be an assembly with a closure provided by a hinged flap 24, on an hinge axle 42 that is spot welded to the annular flange and also carries a spring 44 to bias flap 24 closed over the central hole.

Figure 8:
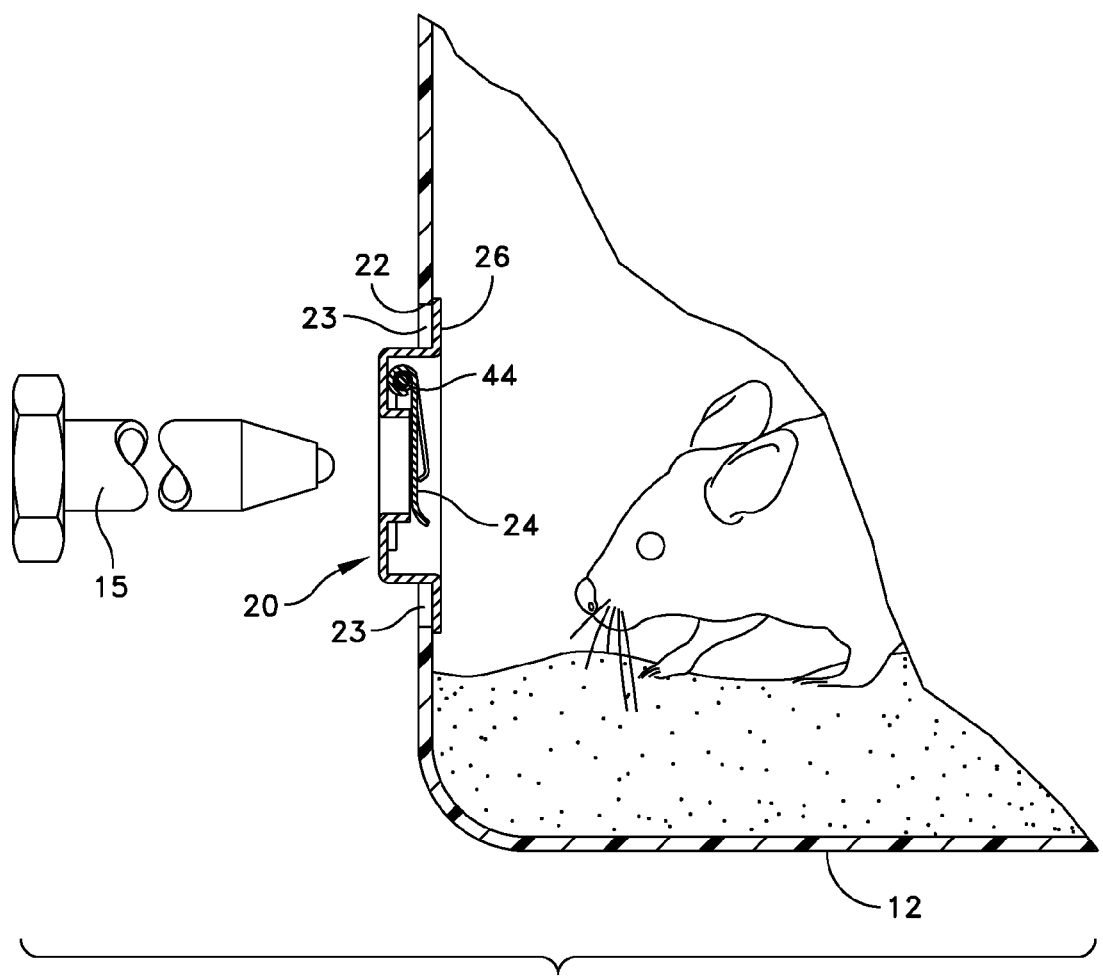
FIG. 8 is a section view through the cage box wall with the flap closed.
Figure 9:
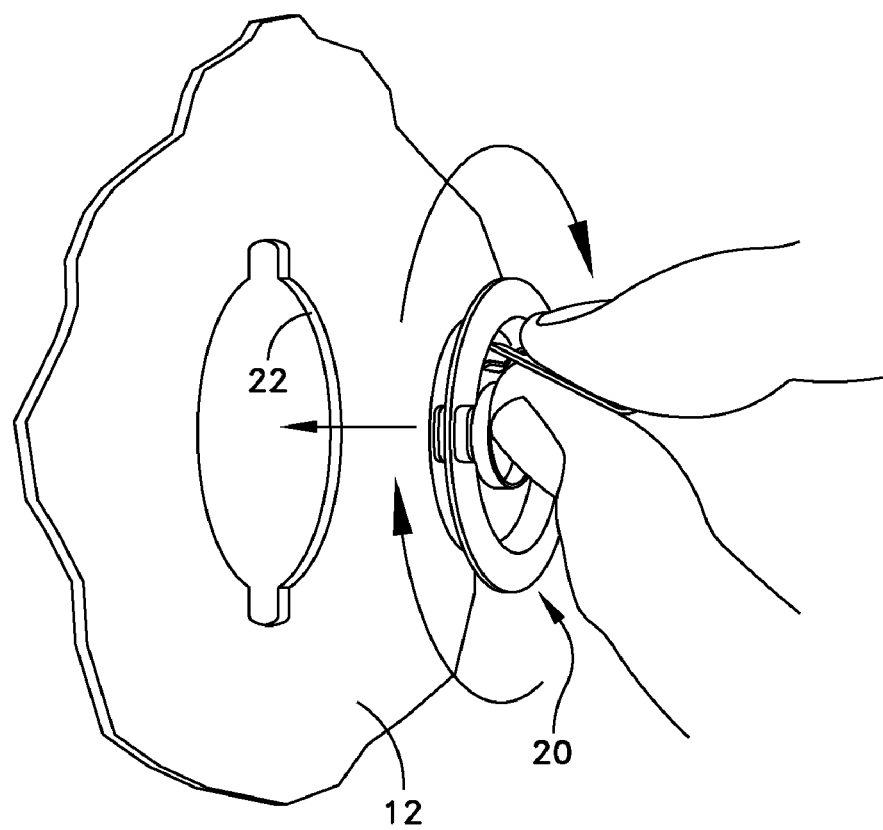
FIG. 9 is an assembly view showing manual manipulation of the grommet via the flap while axially inserting the grommet with the tabs aligned, and twisting the grommet to fix it in position.

FIG. 8 shows that the perimeter flange 26 covers over the tab slots 23 of opening 22 from inside of the cage box when the grommet is in place. Referring to FIG. 7, the edges of the opening 22 in the areas 33 are exposed to the inside of the cage box and might be gnawed upon, but also are backed by tabs 32 on the outside of the cage box wall. FIG. 9 shows that by raising the hinge tab 24, the grommet 20 can be readily held between the thumb and forefinger, and manipulated for insertion, rotation to affix the grommet 20, and also for later rotation to realign the tabs 32 with the tab slots 23 and to remove the grommet.

Figure 10:
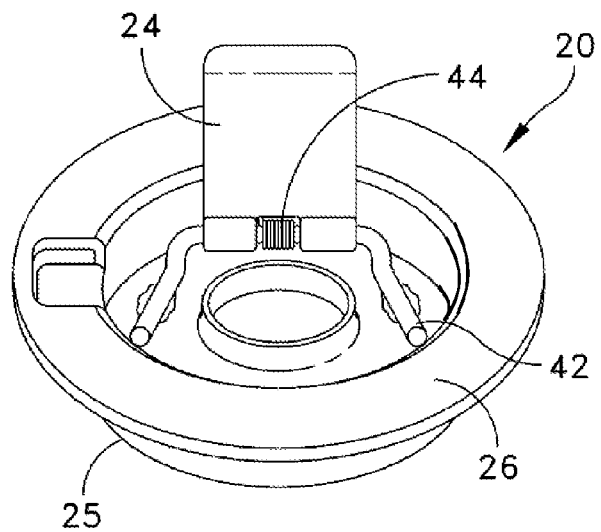
FIG. 10 is a perspective view of the grommet as in FIG. 6, but according to an embodiment having one radial protrusion on the grommet.
Figure 11:
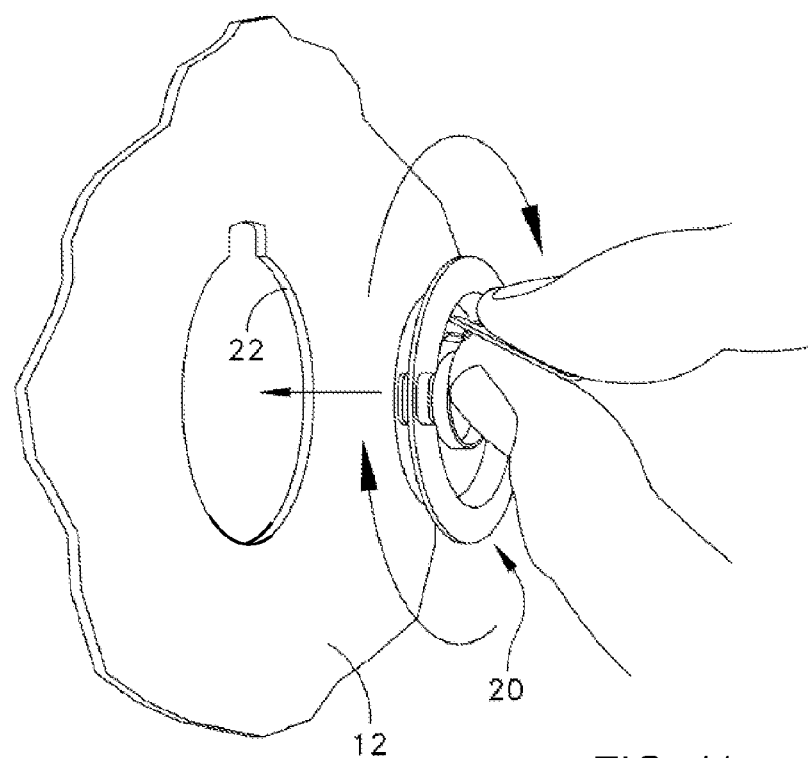
FIG. 11 is an assembly view as in FIG. 9, but according to an embodiment having one radial protrusion on the grommet and also one radial protrusion of the opening.

It is possible to embody the invention with more or fewer structures resembling slots 23 and tabs 32, provided that the outer shape of the structures that are axially spaced from flange 26 (such as body 25 and tabs 32 in FIG. 5) are non-round and complementary to the opening such that the grommet is fixed in place when inserted and twisted. In FIG. 10, for example, a grommet is shown with one radially protruding tab. In FIG. 11, an opening is shown with one radially protruding slot. The grommet of FIG. 10 fits and engages within an opening as shown in FIG. 11 or one as shown in FIGS. 7 or 9.

The grommet body 25, flange 26 and tabs 32 can be stamped and drawn from flat stock, for example 18 or 20 gauge stainless steel. The hinge flap 24, spring 44 and hinge axle 42 are assembled, and the ends of the axle 42 are bent into opposite legs. The legs are affixed to the bottom of the grommet body 25, for example by spot welding using an electric resistance welding technique.

An aspect of the product as disclosed is that grommet assemblies are removable rather than being permanently installed on the cage boxes, or at least made difficult to remove easily or without tools. A removable grommet as described may be employed with any sort of cage box, including high temperature polycarbonate models with relatively thick side walls. However, it is particularly useful to employ removable/re-usable grommets in limited-use disposable cage boxes. Limited-use cage boxes (sometimes termed "disposable") have relatively thinner walls of one or two millimeters thickness, and may comprise a material that is not intended for cleaning and re-use (or at least not apt for autoclaving). By employing the removably attached grommet as described, automatic watering systems are made cost effective with limited use cage boxes. The grommets are general as expensive or even more expensive than limited use cage boxes, but the grommets are compact and durable, easily installed, removed, autoclaved in batches and re-used in a cyclic manner.

The animal cage box has a grommet defining a passage for a watering conduit through a box side wall. The grommet is removably attachable at an opening forming a passage through the side wall, using a non-round configuration by which the grommet is aligned for insertion into a non-round opening, and turned to hold the grommet in place. A flange on the grommet body rests against one face of the side wall. The non-round configuration includes one or more tabs that can be cut from the flange and are displaced axially by a distance equal to the side wall thickness. A hinge flap that can be grasped in the fingers helps to hold, align, insert or remove and twist the grommet relative to the side wall. The disclosed arrangement further minimized the cost of using inexpensive disposable cage boxes because relatively expensive grommets, for example of stainless steel, can be cleaned and reused.

As disclosed in the foregoing examples, an animal enclosure 12 having a side wall is used in combination with a grommet 20 that is removably attachable at an opening 22 forming a passage through the side wall, wherein the opening in the side wall has a non-round shape, for example and without limitation, as shown in the drawings including FIG. 7. The grommet 20 comprises a body 25 and a flange 26 that resides adjacent to the opening 22 on one of two opposite faces of the side wall, such as the inside in the embodiments shown, wherein the flange protects much of the edges of the opening 22 from gnawing by animals confined in the cage box.

Apart from the flange 26 (or optionally in addition to a non-round flange), the grommet 20 comprises a non-round structure that is axially spaced from the flange by a distance at least equal to a thickness of the side wall. In FIGS. 3-6, the non-round structure is defined by the perimeter of body 25 and diametrically opposite tabs 32, which extend radially outwardly from the body 25.

The non-round structure, formed in the example by tabs 32 and body 25, is insertable into the opening 22 in the cage box 12, which opening has a shape that is complementary grommet, i.e., also non-round. When the grommet is aligned to the non-round shape of the hole, the grommet can be inserted and then rotated such that the non-round structure of the grommet is out of alignment with the non-round shape of the hole. This captures the grommet 20 in the side wall of the cage box 12, while the grommet remains readily removable, namely by rotating the grommet forward or back, to align the non-round structure of the grommet once again to the non-round shape of the opening.

The grommet 20 is configured to receive a watering fitting 15 associated with a support for the animal enclosure, such as a cage rack adapted to hold a number of cage boxes. Each can be coupled to a water at one of the cage box locations provided on the rack by placing the cage box in place and pushing the cage box to move the grommet over the water conduit of the fitting. Of course, it is also possible to employ the grommet with other arrangements, for example in the case of a movable water fitting that is brought to the grommet on a flexible hose (not shown).

The grommet 20 defines a hole for passage of a water fitting conduit, or a similar facility that engages the cage with a utility such as air or water, etc. In the example shown, a closure flap 24 is displaceable to admit the conduit, the flap covering the hole when not displaced. Advantageously, the closure flap is configured to hinge on an axis parallel to a plane of the side wall, whereby the closure flap provides a tab that is manually graspable to rotate the non-round structure relative to the non-round shape, as shown in FIG. 9.

Various specific non-round shapes are possible. In the examples shown, the opening in the side wall is round but for at least one tab opening 23, shown in FIG. 7, forming the non-round shape. The tab opening extends radially outward from a round part of the hole in the side wall, over only a part of a circumference of the round part, which in this example is why the open is non-round. Two diametrically opposed tabs 32 are shown. Shapes other than circles can be used as the non-round shape, e.g., rectangular or otherwise polygonal, oval, serrated or irregular, etc.

In the examples shown, the non-round opening and the non-round shape provided by the grommet body 25 and tabs 32 are fully complementary. It is also possible that the two can be insertable and operable to affix the grommet without being entirely complementary in shape. One example would be providing the non-round opening as shown but only one of the two radial tabs 32 on the grommet as shown in FIG. 10.

The grommet 20 as shown comprises a cylindrical body 25 with the flange on one axial end and a bottom forming a hole through the grommet. The part that forms the hole in the grommet and the parts that respectively are inserted through or rested against the cage box side wall are subject to variation, provided that a non-round structure of the grommet is displaced from a flange structure to enable at least one of the two to be inserted through, and both to reside at an axial space from one another, on opposite sides of the cage box wall. For a snug fit, the non-round structure of the grommet, such as the tab(s) as shown, is displaced from the flange by a distance substantially complementary to the thickness of the side wall. The tab(s) 32 in the examples are radially shorter than the flange, such that the flange defines a perimeter opposing the tab.

The invention can be regarded as a method for engaging an animal cage box with a watering fitting in a cage box rack. This involves providing a non-round opening in a cage box wall oriented toward the watering fitting; providing a grommet having a cylindrical body defining a hole sized to receive the watering fitting, the grommet having a flange that is diametrically larger than a minimum diameter of the non-round opening, and the grommet having a non-round structure. The grommet shape or structure is complementary to the non-round opening in the cage box, preferably having at least one tab or similar portion that is diametrically larger than the minimum diameter and is spaced from the flange by a distance at least equal to a thickness of the cage box wall. By aligning the non-round structure to the non-round opening, the grommet can be inserted into the cage box wall. By turning the grommet to misalign the non-round structure to the non-round opening, the grommet is attached and ready to receive the watering fitting. Because the grommet is readily installed, by inserting the watering fitting through the hole in the grommet and turning it, after a useful term of watering an animal, the cage box and watering fitting can be disengaged just as readily. After removing the grommet and preferably cleaning it by autoclaving or otherwise, the grommet can be re-used on a second cage box. This makes the method useful with inexpensive cage boxes, wherein the grommet is as expensive or more expensive than the box itself.

The grommet 20 can be made by stamping the body 25 and flange 26 from sheet metal, cutting at least one tab 32 from the flange 26 to define part of the non-round structure, and displacing the tab 32 axially from the flange 26 as described. Preferably, the tab is cut to a distance that is radially within an outer perimeter of the flange. Alternatively, the tab(s) can be circumferential portions of flange 26 that have been cut through the outer perimeter of flange 26 (not shown). In that case, the tabs 32 and the flange 26 could be adjacent segments from the same annulus of material, wherein alternate adjacent segments are axially displaced from one another.

Assembly and disassembly are facilitated because the closure on the grommet defined by hinge flap 44, arranged to hinge over and cover the hole through the grommet, provides a convenient and effective place at which to manually grasp the grommet while inserting, turning and removing the grommet.

The invention has been described with respect to exemplary and preferred examples that are intended to be representative rather than limiting or exhaustive. Reference should be made to the appended claims to assess the scope of the invention in which exclusive rights are claimed.

What is claimed is:

1. In combination, an animal enclosure having a side wall, and a grommet that is removably attachable at an opening forming a passage through the side wall, wherein the opening in the side wall has a non-round shape; wherein the grommet is configured to receive a watering fitting, wherein the grommet comprises a body and a flange, the flange residing adjacent to the opening on one of two opposite faces of the side wall; wherein the grommet further comprises a non-round structure that is axially spaced from the flange by a distance at least equal to a thickness of the side wall; wherein the non-round structure is insertable through the opening when aligned to the non-round shape, whereby the grommet is captured in the opening by rotating the non-round structure out of alignment with non-round shape, and rendered removable by aligning the non-round structure to the non-round shape, wherein the non-round structure comprises at least one radial protrusion tab from a body of the grommet and the non-round opening is shaped as a round hole having a radial protrusion opening admitting the at least one radial protrusion tab of the body of the grommet, such that the non-round structure of the grommet is complementary with the non-round opening in the side wall.

2. The combination of claim 1, wherein the grommet defines a hole for passage of a water fitting conduit and comprises a closure flap that is displaceable to admit the conduit, the flap covering the hole when not displaced.

3. The combination of claim 2, wherein the closure flap is configured to hinge on an axis parallel to a plane of the side wall, whereby the closure flap provides a tab that is manually graspable to rotate the non-round structure relative to the non-round shape.

4. The combination of claim 1, wherein the opening in the side wall is round but for the at least one radial protrusion tab opening forming said non-round shape, the radial protrusion tab opening extending radially outward from a round part of the side wall over a part of a circumference of the round part.

5. The combination of claim 4, wherein the non-round shape comprises at least two radial protrusion tab openings that are spaced around the circumference.

6. The combination of claim 1, wherein the grommet comprises a cylindrical body with said flange on one axial end and a bottom forming a hole through the grommet, and wherein the non-round structure of the grommet is displaced from one of the body and the flange to reside at an axial space from the flange.

7. The combination of claim 6, wherein the non-round structure of the grommet comprises a radial protrusion tab that is displaced from the flange by a distance substantially complementary to a thickness of the side wall.

8. The combination of claim 7, wherein the radial protrusion tab is radially shorter than the flange, such that the flange defines a perimeter opposing the tab.

* * * * *